United States Patent
Bean et al.

(10) Patent No.: US 9,280,505 B2
(45) Date of Patent: Mar. 8, 2016

(54) SYSTEM ON A MODULE FOR SMART GRID NODES

(71) Applicant: Itron, Inc., Liberty Lake, WA (US)

(72) Inventors: John Bean, Seneca, SC (US); Thomas Benjamin Smith, Landrum, SC (US); Gregory Shane Barrett, Hayesville, NC (US); James Ntaribo Takow, Seneca, SC (US)

(73) Assignee: Itron, Inc., Liberty Lake, WA (US)

( * ) Notice: Subject to any disclaimer, the term of this patent is extended or adjusted under 35 U.S.C. 154(b) by 540 days.

(21) Appl. No.: 13/717,440

(22) Filed: Dec. 17, 2012

(65) Prior Publication Data

US 2014/0167977 A1    Jun. 19, 2014

(51) Int. Cl.
*G06F 13/38* (2006.01)
*G01D 4/00* (2006.01)
*H04Q 9/00* (2006.01)

(52) U.S. Cl.
CPC .............. *G06F 13/385* (2013.01); *G01D 4/002* (2013.01); *H04Q 9/00* (2013.01)

(58) Field of Classification Search
CPC ........... H04Q 9/00; G01D 4/002; G01D 4/00; G06F 13/385; G06F 13/38; H04L 2012/6432
See application file for complete search history.

(56) References Cited

U.S. PATENT DOCUMENTS

| | | | |
|---|---|---|---|
| 2009/0088907 A1 | 4/2009 | Lewis et al. | |
| 2012/0029714 A1 | 2/2012 | Brian et al. | |
| 2012/0036250 A1* | 2/2012 | Vaswani et al. | 709/224 |
| 2012/0054540 A1 | 3/2012 | Howard et al. | |
| 2012/0072389 A1* | 3/2012 | Aldridge et al. | 706/54 |
| 2012/0274440 A1* | 11/2012 | Meadows et al. | 340/3.42 |
| 2013/0154850 A1* | 6/2013 | Chan et al. | 340/870.02 |
| 2014/0067330 A1* | 3/2014 | Flammer, III | 702/188 |
| 2014/0097691 A1* | 4/2014 | Jackson et al. | 307/66 |

FOREIGN PATENT DOCUMENTS

WO    WO2012109719    8/2012

OTHER PUBLICATIONS

PCT Search Report and Written Opinion mailed Feb. 6, 2014 for PCT Application # PCT/US13/62752.

* cited by examiner

*Primary Examiner* — Ebrahim Golabbakhsh
(74) *Attorney, Agent, or Firm* — Lee & Hayes, PLLC

(57) ABSTRACT

A system on a module and techniques for use and operation in multiple different smart grid devices and/or nodes are described herein. One example of a system on a module includes a processor, a flash memory device in communication with the processor, and a RAM memory device in communication with the processor. A connector provides an interface to the smart grid device, and includes a plurality of metrology and communications interfaces.

18 Claims, 5 Drawing Sheets

SYSTEM ON A MODULE FOR SMART GRID NODES

BACKGROUND

Smart grid nodes within a utility communications network may include electrical consumption-measuring meters, gateways, relays and others. Such nodes require both hardware and software to gather, communicate and relay information. However, the operation and design requirements of different networks and nodes may be different. Traditionally, each different node required its own unique design, design test and design review. Accordingly, numerous different hardware devices have been designed to control the functionality of a broad range of smart grid nodes operable on a range of networks. The design, development and verification efforts for this broad range of control devices have been considerable.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components. Moreover, the figures are intended to illustrate general concepts, and not to indicate required and/or necessary elements.

DETAILED DESCRIPTION

Overview

Figure 1:
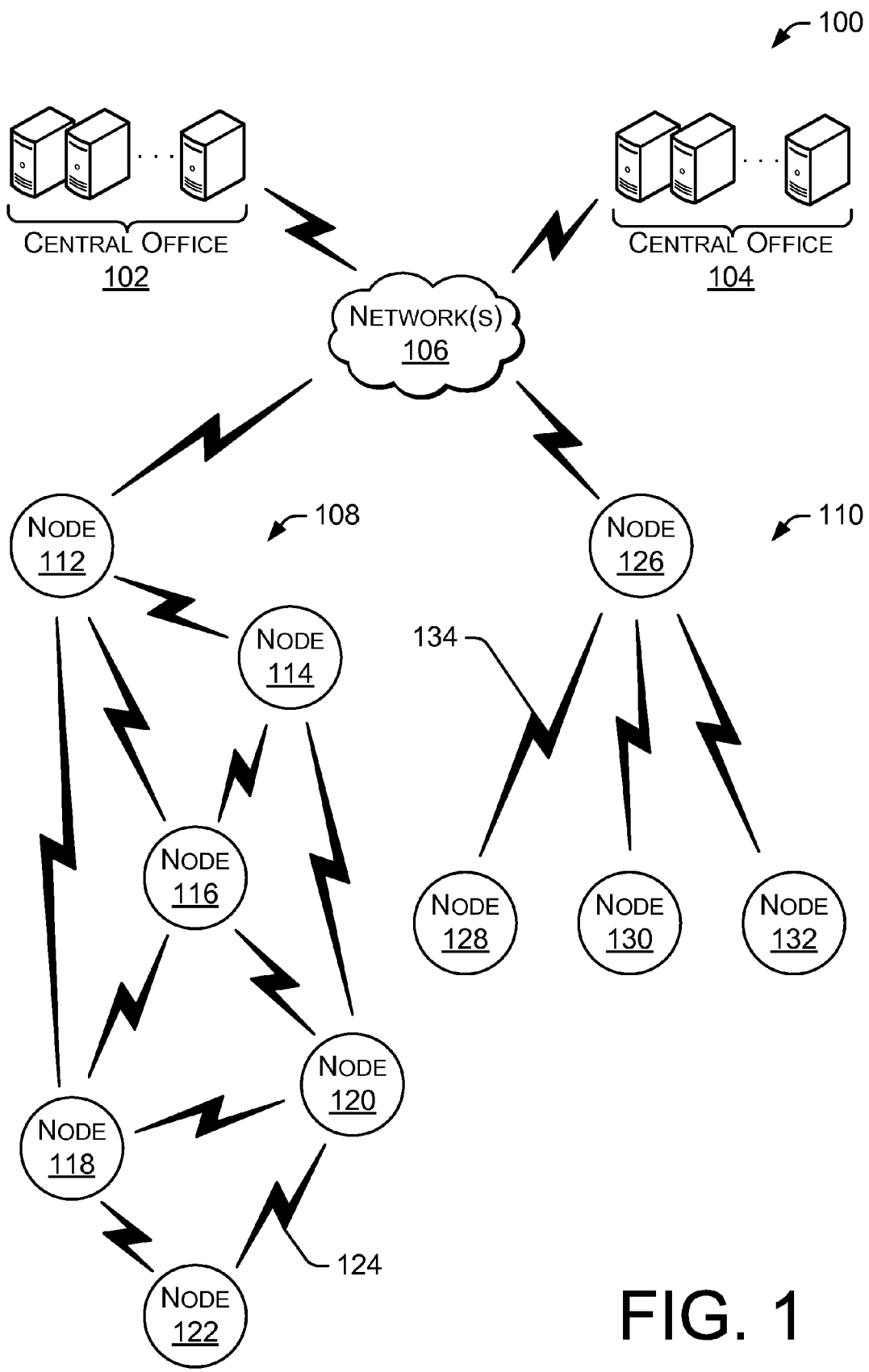
FIG. 1 is a block diagram showing example diverse network environments including diverse smart grid nodes, wherein any node may utilize a ubiquitous system on a module as a control device.

The disclosure describes techniques for providing a system on a module to control and/or operate a smart grid node, such as an electric meter, a data access (DA) gateway, a relay or other network component and/or node. In one example, the system on a module may include a processor, flash (persistent) memory, random access memory (RAM), and other components to provide interfaces. Examples of possible interfaces include a communications interface and/or a metrology interface.

A communications interface may include one or more of universal serial bus (USB) ports, IDIO ports, inter-integrated circuit ($I^2C$) interface ports, analog to digital converter (ADC) channel, secure digital input/output (SDIO) interface, serial port interface (SPI), universal asynchronous receiver/transmitter (UART) and/or general purpose input/output (GPIO). Use of any of these ports allows connection to external communications hardware, i.e. communications hardware that is not located on the system on a module. The communications hardware may be located on a communications module within the network node.

The metrology interface may include one or more UART, Watt disk emulator (WDE) GPIO and/or line sync (LSYN) GPIO, etc. Use of any of these ports allows connection to external metrology hardware, i.e. metrology hardware (sensors, etc.) that is not located on the system on a module. The metrology hardware may be located on a motherboard within the network node.

The discussion herein includes several sections. Each section is intended to be non-limiting. More generally, this entire description is intended to illustrate example aspects of example systems on a module, smart grid nodes and/or networks, but not components or techniques which are required. The discussion begins with a section entitled "Example Networks," which describes one environment that may implement the techniques described herein. This section depicts and describes smart grid networks and operation of a system on a module at a high-level architecture. Next, a section entitled "Example Smart Grid Device" illustrates and describes aspects of a system on a module, and how such a system may interface with, control and/or operate a smart grid node. This section addresses general concepts involving smart grid nodes with a specific example involving an electric meter. Next, a section entitled "Example System on a Module" illustrates and describes aspects that can be used to provide a system on a module for use in the utility industry, smart grids and electrical metering. This section addresses example aspects that may be used to provide a system on a module that is usable with a number of smart grid nodes, including electrical meters, DA gateways, relays, etc. Next, a section entitled "Example Software and File Systems" illustrates and describes aspects that can be used to provide software on an example system on a module adapted for use in the utility industry. This section addresses examples of software configuration that interact synergistically with the hardware of the system on a module. Finally, the discussion ends with a brief conclusion. This brief introduction is provided for the reader's convenience and is not intended to describe and/or limit the scope of the claims or any section of this disclosure.

Example Networks

FIG. 1 is a block diagram showing example smart grid network 100. In the example shown, the smart grid network includes two central offices 102, 104, each of which is in communication with a central network 106, such as the Internet. In the example shown, the central office 102 is in communication with a "mesh" type network 108, while the central office 104 is in communication with a "star" type network 110.

The mesh network 108 includes nodes 112-122, which may be representative of a large number of nodes in a complex network. The network is a "mesh" network, in that each node may communicate with one or more adjacent nodes, such as by radio frequency (RF) communications 124 or over power line communications (PLC). In one example, one or more of nodes 112-122 may be an electric meter, which gathers consumption data using a metrology portion of the meter. A communications portion of the meter may send and/or relay the consumption data from a meter to an adjacent meter. Adjacent meters continue to relay the data until it reaches a root node (e.g., node 112) which may transfer the information through network 106 (e.g., using backhaul communications) to the central office 102.

In one example, one or more nodes 112-122 may have metrology hardware, e.g., devices that are configured to collect and manage consumption information (e.g., electrical usage or consumption) of a home, business or other establishment. Similarly, each node 112-122 may have communications hardware, which may include RF radios and/or PLC devices to transmit information (e.g., within RF signal 124) to adjacent nodes. The metrology hardware, the communications hardware and/or other devices and functions may be controlled, managed and/or otherwise operated by a system on a module that is attached to, and part of, the node.

The star network 110 includes nodes 126-132, which may be representative of a large number of nodes in a complex network. The network is a "star" network, in that each node 128-132 may communicate with a root node 126, such as by means of a cellular modem or other RF device. The root node 126 may be located "in the field" with the nodes 128-132, or may be located at the central office 104.

In one example, one or more nodes 126-132 may have metrology hardware, e.g., devices that are configured to collect and manage consumption information (e.g., electrical usage or consumption) of a home, business or other establishment. Similarly, each node 126-132 may have communications hardware, which may include a cellular modem and/or other RF radios or devices to transmit information 134 over backhaul communications to a root node or central office. Moreover, the metrology hardware, the communications hardware and/or other devices and functions may be controlled, managed and/or otherwise operated by a system on a module that is attached to, and part of, the node.

Example Smart Grid Device

Figure 2:
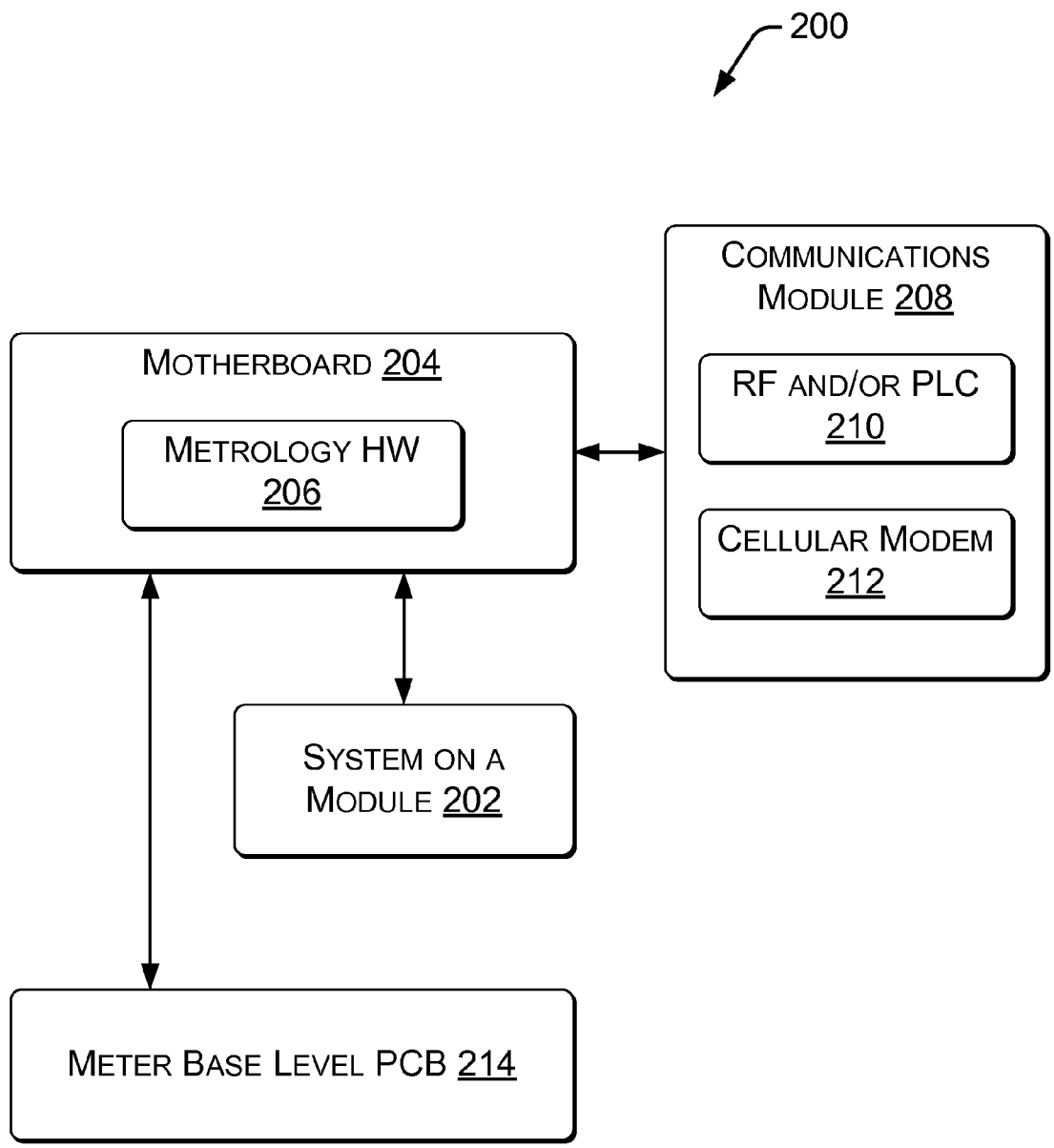
FIG. 2 is a block diagram showing example detail of hardware components in a metering device that is representative of one or more nodes in the network(s) of FIG. 1.

FIG. 2 is a block diagram showing example node 200, which may be operable within the smart grid network 100 of FIG. 1. The example node 200 provides detail of hardware components consistent with a metering device to measure electrical consumption. Alternatively, the node could be another component in a smart grid (e.g., a relay) or a gas meter, water meter or other device. In the example electric meter, a system on a module 202 is connected (e.g., by an edge connector, surface mount solder connection or other means) to a mother board 204.

The mother board 204 may include metrology hardware 206, which may measure the flow of electricity consumed by a customer, thereby creating "consumption data." In a manner consistent with the "mesh" network 108 of FIG. 1, the motherboard 204 may communicate with a communications module 208, which may include one or more RF and/or PLC devices or modems 210. The RF or PLC devices 210 provide communication links to adjacent nodes and allow for formation and operation of a mesh network.

In a manner consistent with the "star" network 110 of FIG. 1, the mother board 204 may communicate with the communications module 208, which may include a cellular modem 212 or other radio device having sufficiently long range communication ability to communicate with a root node or a central office. In many applications, the communications module 208 will be provided with and/or utilize only one of the RF and/or PLC device 210 or cellular device 212.

A meter base level PCB 214 may be instantiated on a separate printed wiring board (PWB) and/or printed circuit board (PCB). In an electrical meter example, current to be measured may flow through the meter base level PCB 214. A connection between the meter base level PCB 214 and the motherboard 204 may include an elevated or extended half-turn coil. The half-turn coil may be located on the meter base level PCB 214, and may extend toward the metrology hardware 206 on the motherboard 204. In view of the extension, the half-turn coil may be physically located by or near elements of the metrology hardware 206. For example, the half-turn coil may be located near a Hall effect sensor or other current measuring device on the metrology hardware 206. Alternatively, a shunt, a current transformer or a mutual induction coil can be used instead of the current coil and Hall effect sensor.

In operation, the system on a module 202 manages the metrology hardware 206, meter base level PCB 214 and communications module 208 (and devices 210 and/or 212). The system on a module 202 may obtain and organize sensor data, consumption information and/or any auxiliary data (e.g., date and time) that is required. More particularly, current flow and/or power through the meter base level PCB 214 may be detected by sensor devices within the metrology hardware 206 of the motherboard 204. The system on a module 202 may organize and format the sensor data, timestamps, and other information. The system on a module 202 may perform current flow calculations, power consumption calculations, date and/or time recordings and/or information formatting. The system on a module 202 may manage data and information, and maintain data structures, data files and/or file systems.

The system on a module 202 may also manage communications module 208, to control the RF and/or PLC hardware 210 and/or the cellular modem 212. The system on a module may control communications functionality, including creating packets, utilizing protocols and operating transmitting and/or receiving hardware. Accordingly, the system on a module 202 may transmit the sensor information, current or power consumption values and/or other desired information through the network (e.g., networks 108, 110 of FIG. 1).

Example System on a Module

Figure 3:
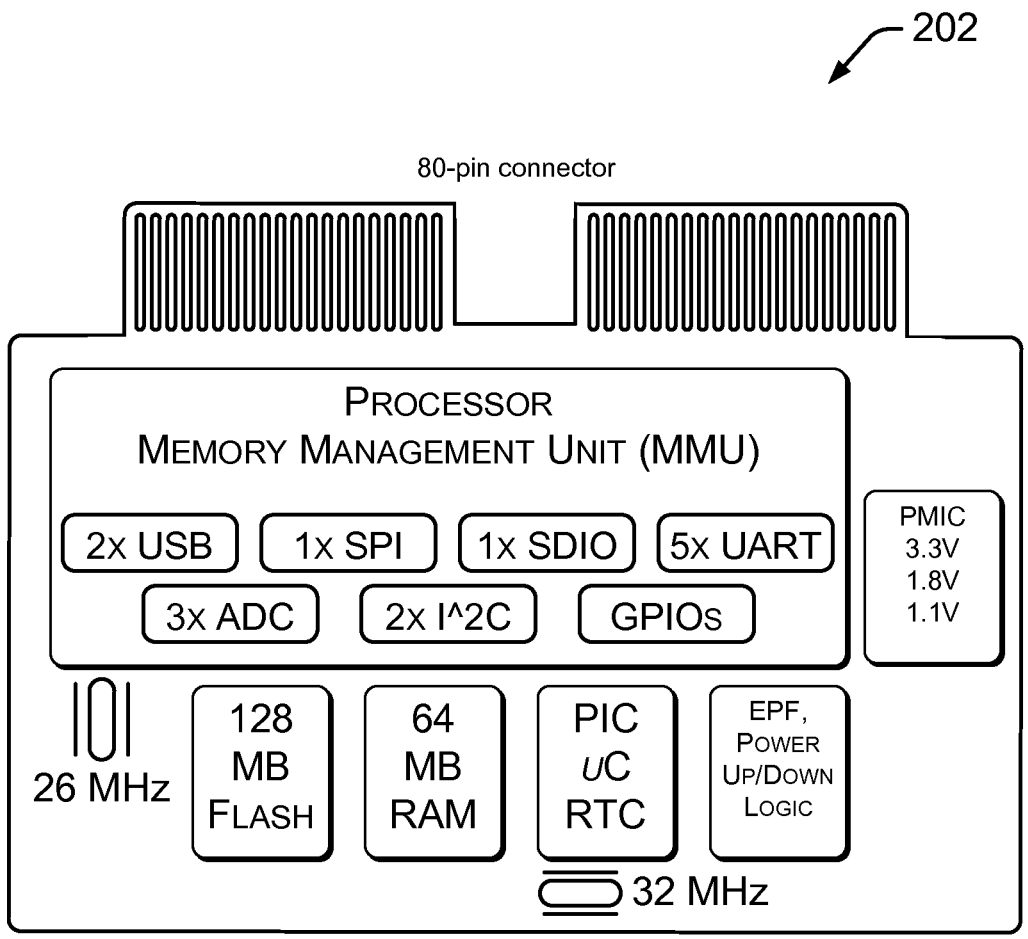
FIG. 3 is block diagram showing a first example of hardware aspects of the system on a module of FIG. 2.

FIG. 3 is block diagram showing example detail of the system on a module 202 of FIG. 2. The detail of FIG. 3 is intended to be representative, and not limiting; accordingly, some variation may be indicated by any particular implementation of a system on a module.

In the example system on a module 202, an 80-pin edge connector facilitates connection to a motherboard or other connection site. A microprocessor may operate a memory management unit (MMU) and may execute an operating system (OS), such as LINUX or other modern OS. The system on a module 202 may include flash memory device(s) and/or RAM memory device(s). These memory devices may be accessed by the processor, and used to store the operating system, drivers, utilities, program applications, data and/or data structures and other information.

The system on a module 202 may include a metrology interface, which may be used to connect to metrology hardware (e.g., metrology hardware 206 in FIG. 2). The metrology interface may pass commands that control the external metrology hardware and that obtain consumption data. Such metrology hardware may be external, i.e., located off the system on a module 202. In the example of FIG. 2, the metrology hardware is located on motherboard 204. The metrology interface may include several interface types, thereby allowing the system on a module 202 to be utilized with a variety of metrology devices. The metrology interface may include: a universal asynchronous receiver/transmitter (UART) (e.g., configured for a BLURT protocol); a watt disc emulator (WDE) configured for GPIO; a line sync (LSYNC) configured for GPIO; and/or other interfaces as indicated by needs.

The system on a module 202 may include a communications interface, which may be used to connect to communications hardware. Such communications hardware may be external, i.e., located off the system on a module 202. Communications module 208 of FIG. 2 is one example of such an external communications module. The communications interface may send commands and receive responses to control the external communications hardware. Additionally, the communications interface may pass information for transmission and/or upon receipt. The communications interface may include several interface types, thereby allowing the system on a module 202 to be utilized with a variety of communication devices and systems. The communications interface may include: universal serial bus (USB) ports, IDIO ports, inter-integrated circuit (I²C) interface ports, analog to digital converter (ADC) channel, secure digital input/output (SDIO) interface, serial port interface (SPI), universal asynchronous receiver/transmitter (UART) and/or general purpose input/output (GPIO).

A PIC microcontroller with real time clock may be used to provide time and date information, such as for use in conjunction with metrology data. An EPF, with power up/down logic may be used to reduce power consumption. A power management IC may be used to regulate voltages required by various devices on the system of a module 202. In the example shown, 3.3, 1.8 and 1.1 volt values are regulated. However, a different PMIC and/or different voltage values could be provided, as needed.

Figure 4:
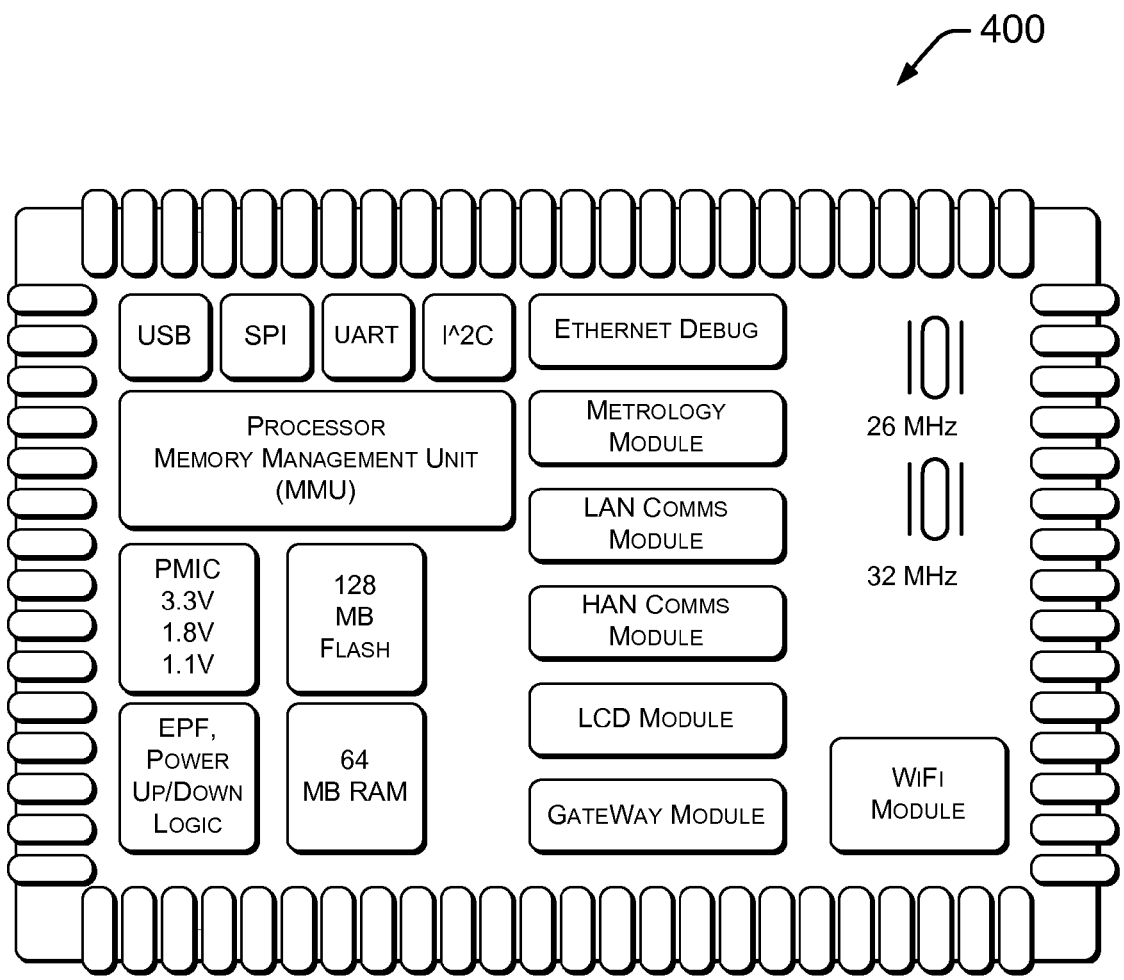
FIG. 4 is block diagram showing second example of hardware aspects of the system on a module of FIG. 2.

FIG. 4 is a second example 400 of the system on a module of FIG. 2. In this example, the system on a module 202 may be attached (e.g., by surface mount technology) to the mother board (e.g., motherboard 204 of FIG. 2). Thus the system on a module may or may not be circuit-card mounted. The example of FIG. 4 is otherwise substantially similar the example of FIG. 3. Several software elements are shown, including a metrology daemon, a LAN communications daemon, a home area network (HAN) daemon, a liquid crystal display (LCD) daemon and a gateway daemon. A Wi-Fi module, which may be present in any version of the system on a module, is shown in the system on a module 400.

Example Software and File Systems

Figure 5:
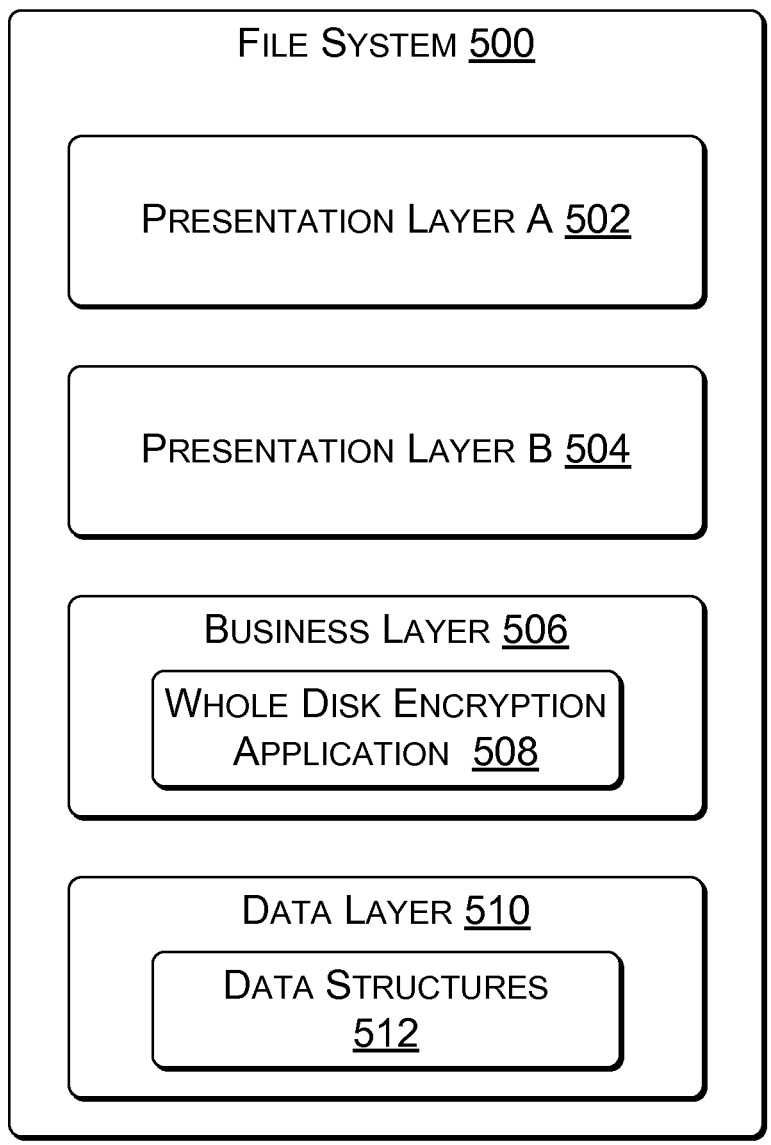
FIG. 5 is block diagram showing example detail of software aspects of the system on a module of FIG. 2.

FIG. 5 is block diagram showing an example of a file system 500, which may be defined in the flash memory (e.g., as seen in FIG. 3 or 4) of the system on a module. The file system may include one or more presentation layers, such as presentation layers 502, 504. In one example, developers can use the base presentation layer classes to generate aspects including DLMS/COSEM, C12.22/C12.19 and SEP 2.0 support without changing any core functionality, such as the business layer 506. In a more general sense, changes may be made to the upper layers 502, 504, without changing the lower layers 506-512. Accordingly, the system on a module may be developed more rapidly than if all software layers had to be redeveloped.

In a further example, network development may be facilitated by re-use of one or more software layers in two or more networks or on two or more nodes or node types. In such an example, one or more presentation layers (e.g., presentation layers 502, 504) may include software operable in a first network (e.g., mesh network 108 of FIG. 1). However, different presentation layers may be used in a second or different network (e.g., star network 110 of FIG. 1). Use of different presentation layers in different networks may be required due to differences in the networks' technologies (e.g., mesh network vs. star network) and/or different design constraints or requirements, etc. However, even if some software layers designed for a first network have to be changed for use in a second network, other software layers may be re-used. For example, a business layer 506 and/or a data layer 510 (including data structures 512) may include software operable in both networks (e.g., networks 108 and 110). Accordingly, design of one network (e.g., mesh network 108) may include one or more software layers (e.g., layers 506, 510) that may be re-used in a second network (e.g., star network 110). However, other software layers may have to be altered, re-written and/or recompiled.

In one example, a whole disk encryption application 508 may be used to encrypt the entire file system 500 and/or the entire flash memory device on the system on a module seen in FIGS. 3 and/or 4. An encryption engine may utilize the application 508 and/or may utilize an algorithm based in hardware. In operation, the encryption engine may encrypt written to, and decrypt data read from, the file system on the flash memory. The encryption engine may incorporate a value (e.g., an integer or alpha-numeric character string) unique to the processor to perform the encryption and decryption. Because the unique value is not present in any other processor, movement of the flash memory to another system on a module will result in failure to decrypt the file system.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system, comprising a plurality of smart grid components, including:
    a first node, comprising:
        a first system-on-a-module, the first system-on-a-module comprising:
            a first processor;
            a first flash memory device, in communication with the first processor; and
            a random access memory (RAM) device, in communication with the first processor; and
        first metrology hardware in communication with the first processor; and
    a second node comprising:
        a second system-on-a-module, the second system-on-a-module comprising:
            a second processor; and
            a second flash memory device, in communication with the second processor, wherein at least two software layers are defined on the second flash memory device, the at least two software layers comprising:
                a first software layer associated with a first network that is used to communicate with the first node; and
                a second software layer associated with a second network that is not used to communicate with the first node; and
        second metrology hardware in communication with the second processor.

2. The system of claim 1, wherein the first node additionally comprises an interface for use with:
    a gateway;
    an electrical meter; and
    a relay.

3. The system of claim 1, wherein the first node additionally comprises:
    at least three types of communications interfaces; and
    a communication module communicatively coupled to the first system-on-a-module;
    wherein the first system-on-a-module directs, using commands sent through one of the at least three types of communications interfaces, the communication module to transmit data in a network.

4. The system of claim 1, wherein the first node additionally comprises:
- a motherboard controlled by the first system-on-a-module;
- a communications module to connect to a network and to communicate metrology information obtained from the first metrology hardware; and
- a meter base level printed circuit board (PCB) in communication with the mother board, the meter base level PCB comprising:
  - a current-carrying elements on the PCB; and
  - switches to regulate the current on the PCB.

5. The system of claim 1, wherein each of the first and second nodes additionally comprises at least two types of metrology interfaces are selected from among a group consisting of:
- a universal asynchronous receiver/transmitter (UART) configured for a one-way messaging (BLURT) protocol;
- a watt disc emulator (WDE) configured for general purpose input/output (GPIO); and
- a line sync (LSYNC) configured for GPIO.

6. The system of claim 1, wherein each of the first and second node additionally comprises at least three types of communications interfaces, selected from among a group consisting of:
- a universal serial bus (USB);
- a secure digital input/output (SDIO) interface;
- an inter-integrated circuit ($I^2C$) interface;
- an analog to digital converter (ADC) channel;
- a serial port interface (SPI);
- a universal asynchronous receiver/transmitter (UART); and
- a general purpose input/output (GPIO).

7. The system of claim 1, wherein each of the first and second node additionally comprises layers of software in respective flash memory devices that comprise:
- a presentation layer to include software operable in a first network;
- a business layer to include software operable in the first network and a second network; and
- a data layer to include software and data structures operable in the first network and the second network;
- wherein content in the layers are separately compiled and stored with a file system defined on the flash memory.

8. The system of claim 1, wherein each of the first and second node additionally comprises:
- an encryption engine to encrypt and decrypt data in a file system on the flash memory based at least in part on a value unique to the processor.

9. An electric meter, comprising:
- a processor;
- a flash memory device, in communication with the processor;
- a random access memory (RAM) memory device, in communication with the processor;
- metrology hardware;
- a communications module;
- wherein the processor controls operation of:
  - the metrology hardware within the electric meter to measure consumption data; and
  - the communications module within the electric meter to transmit the consumption data; and
- at least two software layers, defined on the flash memory device, wherein:
  - a first software layer is configured for use on a first network; and
  - a second software layer is configured for use on a second network.

10. The electric meter of claim 9, wherein:
- the processor, flash memory device and RAM memory device are configured as a system-on-a-module that directs the communication module to transmit and/or receive data.

11. The electric meter of claim 9, additionally comprising:
- a universal asynchronous receiver/transmitter (UART) in communication with the processor;
- a watt disc emulator (WDE) in communication with the processor; and
- a line sync (LSYNC) in communication with the processor.

12. The electric meter of claim 9, wherein the processor, flash memory device and RAM memory device are configured as a system-on-a-module having hardware interfaces for backhaul communications on star networks and on mesh networks and for backhaul communications over a direct cellular connection, radio frequency (RF) and power line communications (PLC).

13. The electric meter of claim 9, wherein:
- the processor, flash memory device and RAM memory device are configured as a system-on-a-module having hardware interfaces to communications devices operable on star and mesh networks; and
- the processor is configured to provide instructions over at least one of the hardware interfaces to the communications devices.

14. The electric meter of claim 9, additionally comprising an encryption engine to encrypt and decrypt data in a file system on the flash memory device based on an internal value unique to the processor.

15. A system-on-a-module, comprising:
- a processor;
- a flash memory device, in communication with the processor, the flash memory device comprising at least two software layers that are defined on the flash memory device, wherein:
  - a first software layer is configured for use on a first network; and
  - a second software layer is configured for use on a second network;
- a RAM memory device, in communication with the processor;
- a metrology interface to control metrology hardware and to obtain consumption data, the metrology hardware external to the system-on-a-module; and
- a communications interface to control communications hardware and to transmit and receive data, the communications hardware external to the system-on-a-module;
- wherein the processor is configured to format the consumption data and to direct the communications hardware to transmit the formatted consumption data.

16. A star network, comprising a plurality of network devices, each comprising the system-on-a-module of claim 15,
- wherein the system-on-a-module controls direct cellular connection communications hardware.

17. A mesh network, comprising a plurality of network devices, each comprising the system-on-a-module of claim 15,
- wherein the system-on-a-module controls radio frequency (RF) communications hardware to communicate with at least one adjacent node.

18. A smart grid component, comprising:
the system-on-a-module of claim 15;
the communications hardware, in communication with the processor;
wherein the system-on-a-module directs operation of the communication hardware.

\* \* \* \* \*